US006640911B2

(12) United States Patent
Lieser et al.

(10) Patent No.: US 6,640,911 B2
(45) Date of Patent: Nov. 4, 2003

(54) DEVICE FOR CONNECTING A TOOL TO A DRIVE

(75) Inventors: Karl Lieser, Wuppertal (DE); Andreas Dierolf, Untermuenkheim (DE); Frank Kollmar, Loewenheim (DE)

(73) Assignee: Adolf Wuerth GmbH & Co. KG, Kuenzelsau (DE)

( * ) Notice: Subject to any disclaimer, the term of this patent is extended or adjusted under 35 U.S.C. 154(b) by 0 days.

(21) Appl. No.: 09/865,224

(22) Filed: May 25, 2001

(65) Prior Publication Data

US 2002/0000334 A1 Jan. 3, 2002

(30) Foreign Application Priority Data

May 26, 2000 (DE) ........................................ 100 26 205

(51) Int. Cl.$^{7}$ ................................................ C09K 7/00

(52) U.S. Cl. ...................... 175/170; 175/256; 175/257; 408/239 A; 408/240

(58) Field of Search ...................... 166/242.6; 175/170, 175/203, 256, 257, 320; 408/238, 239 R, 240, 239 A

(56) References Cited

U.S. PATENT DOCUMENTS

| | | | | |
|---|---|---|---|---|
| 2,360,732 | A | * | 10/1944 | Smith |
| 2,595,818 | A | | 5/1952 | Smila |
| 3,744,350 | A | | 7/1973 | Raff |
| 3,750,087 | A | * | 7/1973 | Vetter |
| 4,319,434 | A | * | 3/1982 | Brejcha |
| 4,536,113 | A | * | 8/1985 | Hatfield |
| 4,674,341 | A | * | 6/1987 | Koenig |
| 6,178,884 | B1 | * | 1/2001 | Weschenfelder |

FOREIGN PATENT DOCUMENTS

| | | |
|---|---|---|
| DE | 352392 | 5/1922 |
| DE | 31046 26 | 9/1982 |
| DE | 31 44 901 | 5/1983 |
| DE | 36 23 056 | 1/1988 |
| DE | 38 00 394 | 7/1989 |
| DE | 4143218 A1 | 9/1992 |
| DE | 41 43 218 | 9/1992 |
| DE | 198 18 327 | 10/1999 |
| EP | 0318669 A1 | 6/1989 |
| JP | 55044136 | 3/1980 |

* cited by examiner

*Primary Examiner*—Roger Schoeppel
(74) *Attorney, Agent, or Firm*—Quarles & Brady LLP

(57) ABSTRACT

A device for connecting a tool to a mechanical drive contains as the coupling element a spring washer coupling or clutch, which is made in one piece from metal and at least in the rotation direction has a limited resilience. Use is made thereof for preventing torque peaks in the case of a sudden deceleration of the tool, e.g. if a screw strikes a wood surface.

6 Claims, 2 Drawing Sheets

DEVICE FOR CONNECTING A TOOL TO A DRIVE

BACKGROUND OF THE INVENTION

The invention relates to a device for connecting a tool to a mechanical rotary drive. The tool can e.g. be a bit or also drilling/cutting tools such as e.g. countersinking cutters, taps or reamers. With tools of this type the problem arises that the alignment between the workpiece to be rotated, e.g. a screw, and tool is not always correct. Numerous proposals for solving this problem exist.

For example a flexible socket wrench is known (DE 36 24 686), where the pivotability is ensured by pins at right angles to the longitudinal axis of the tool.

A screwdriver with an articulated head part is also known (DE 94 03 845), where use is made of a tubular rubber spring.

A device for connecting screwdriver inserts to a drive mechanism is known (DE 41 43 218), where a torsion coupling is provided, which allows an angular movement between the driving part and the driven part.

In the case of socket wrenches a further problem arises in that very high torques can occur on stopping the screwing movement and which can lead to the destruction of the tool or also the screw. If on turning a screw into hard wood the screw head reaches the wood surface, a sudden torque occurs and a release clutch on the drive is no longer able to immediately flatten the torque peaks.

The problem of the invention is to provide a device for connecting a tool to a mechanical rotary drive, which compared with the prior art offers advantages with respect to the service life of the tool and/or screw.

SUMMARY OF THE INVENTION

The invention relates to a device for connecting a tool to a rotary driving apparatus through a spring disc coupling, also referred to herein as a spring washer coupling.

The spring washer coupling or clutch is a component built up in one piece from a plurality of parallel, ring-shaped washers, which are interconnected with the aid of webs. The webs pass along a diameter. The webs between two washers are displaced by 90ø with respect to the webs between the next two washers. Such a spring washer coupling is e.g. known from EP 318 669 and is intended to compensate any alignment errors of the axes which occur and these can be both angle errors and displacement errors.

According to a further development of the invention the drive element and driven element are mounted in such a way that they are always positioned coaxially. In this case the spring washer coupling is not used for compensating alignment errors of rotation axes. Instead it serves exclusively to bring about in the rotation direction a slight flexibility or resilience of the coupling element and to reduce the aforementioned impacts when the screwing movement is suddenly stopped.

However, it is also possible to mount the drive element and driven element in such a way that an angle compensation of their rotation axes is possible.

In order to bring the coupling element in a particularly simple manner into rotary engagement with the drive element and/or driven element, according to the invention it is possible for the at least one entry end of the coupling element to have a polygonal, e.g. hexagonal shape, which engages in a complimentary recess of the drive element and/or driven element.

The spring washer coupling also has resilience characteristics in the axial direction. According to the invention the coupling element can have an end clearance.

A possible tool, which can be connected to the rotary drive by the device is a bit for a mechanical screwdriver. Here it is mainly a question of reducing sudden torque peaks.

However, according to the invention the device can also be used with a drill, where it is appropriate to integrate the described coupling element e.g. into a drill chuck.

According to a further development of the invention the coupling element is constructed in one piece with the drive element and the driven element. As a result the number of components of the connecting element is reduced. In addition, the device then has a simpler construction.

According to a further development of the invention the gaps between the parallel, ring-shaped washers of the spring washer coupling are filled, e.g. extruded completely or partly with a relatively hard or rigid elastomer material. Extrusion with a soft elastomer material does not modify the resilience characteristics of the spring washer coupling, but can prevent the penetration of dirt. Extrusion can take place in such a way that also the outside is covered with an elastomer coating, so that it is no longer possible to see the slits.

BRIEF DESCRIPTION OF THE DRAWINGS

Further features details and advantages of the invention can be gathered from the following description of a preferred embodiment thereof and with reference to the attached drawings, wherein show.

DETAILED DESCRIPTION

Figure 1:
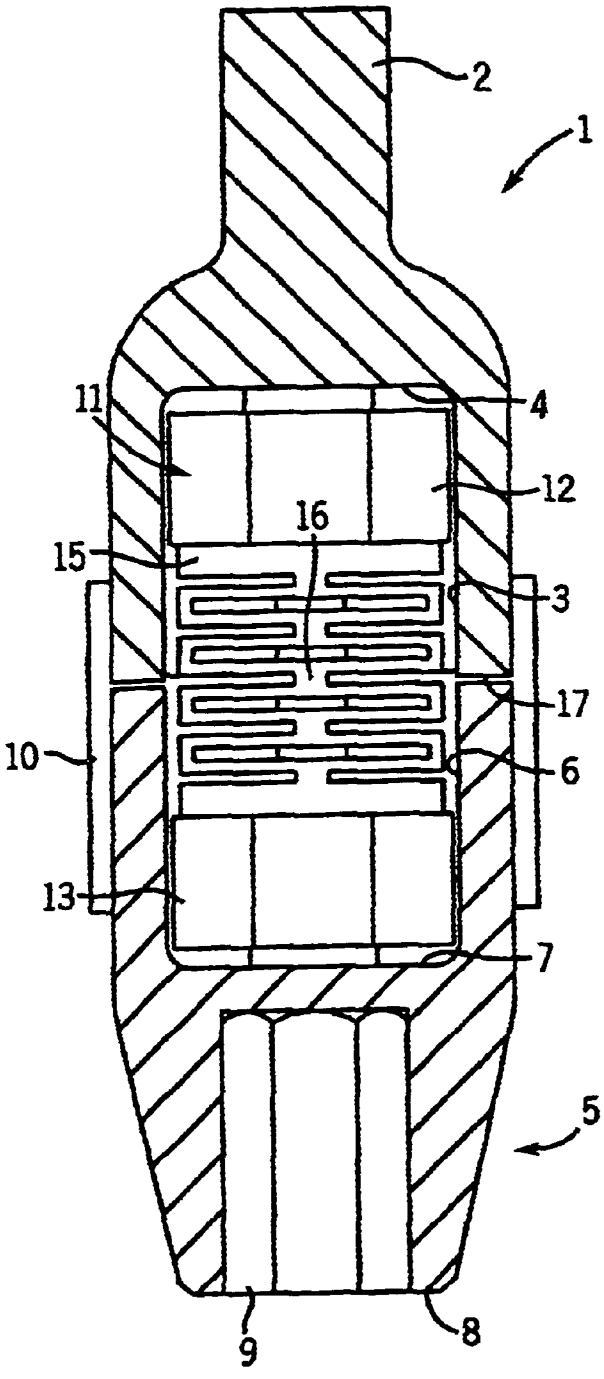
FIG. 1 Diagrammatically a longitudinal section through a device according to the invention.

FIG. 1 shows in a highly diagrammatical, simplified form a device with which a tool, e.g. a bit, can be connected to an electric screwdriver. The device contains a drive part 1 with a shank 2, which can either be fixed in a chuck or can be directly connected to the drive. The drive part 1 has an inner recess 3 open to one face and which in the vicinity of the bottom 4 of the recess 3 has a hexagonal cross-section. The recess 3 has a circular construction in the area located further towards the open face.

Coaxially to the drive part 1 is provided a driven part 5, which also has an inner recess 6 open to one face. The two inner recesses 3, 6 are arranged in reciprocal extension and pass into one another when the parts are assembled. The inner recess 6 has in the vicinity of its bottom 7 a hexagonal cross-section, to which is connected an area with a circular cross-section.

On the axial face 8 of the driven part 5 remote from the recess 6 is formed a hexagonal receptacle 9 for the bit. By means of an outer sleeve 10, which is only shown in simplified form, the two parts 1,5 are held in such a way that they are axially aligned, but separated by an axial gap 17.

In the two inner recesses 3 and 6, which pass into one another, is inserted a coupling element 11 to be described in greater detail hereinafter. The axial extension of the coupling element 11 is somewhat smaller than the spacing of the bottoms 4, 7 of the two inner recesses 3, 6, so that the coupling element 11 has a certain end clearance.

The upper end of the coupling element 11 in FIG. 1 has a hexagonal cross-section corresponding to the cross-section of the corresponding area of the inner recess 3. By means of said engagement end 12 the coupling element 11 engages in the inner recess 3 of the drive part 1 in the rotation direction.

At the opposite end the coupling element 11 also has an engagement end 13 with a hexagonal cross-section, which is adapted to the hexagonal cross-section of the inner recess 6 in this area. The coupling element 11 also engages with this engagement end 13 in non-rotary manner in the driven part 5.

Figure 2:
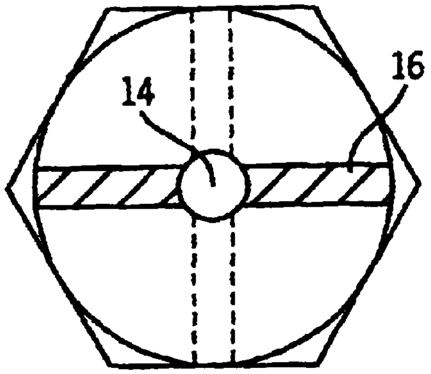
FIG. 2 A section along line II—II in FIG. 1.

Between the upper engagement end 12 and the lower engagement end 13 the coupling element has a cylindrical body, which forms or represents a spring washer coupling or clutch. The spring washer coupling has an axial bore 14, cf. FIG. 2. It comprises a plurality of spring washers 15, which have a small mutual spacing in the axial direction. The spring washers are interconnected by webs 16, cf. the section of FIG. 2, which run in the radial direction from the axial bore 14 to the edge. In other words the webs 16 pass along a diameter. The webs 16 between two washers are displaced by 90ø with respect to the webs between one of the two washers and the in each case next spring washer 15. In this way a resilience or flexibility is obtained in the axial direction, together with a deflectability. However, no use is made thereof in the arrangement according to FIG. 1. What is important for the application case shown here is the slight, but very controlled flexibility in the rotation direction. The coupling element here acts as a torsion spring.

Through the choice of the thickness of the spring washers 15, the width of the webs 16 and the number thereof, the material and diameter of the central bore 14, it is possible to bring about a desired spring characteristic of the spring washer coupling.

Figure 3:
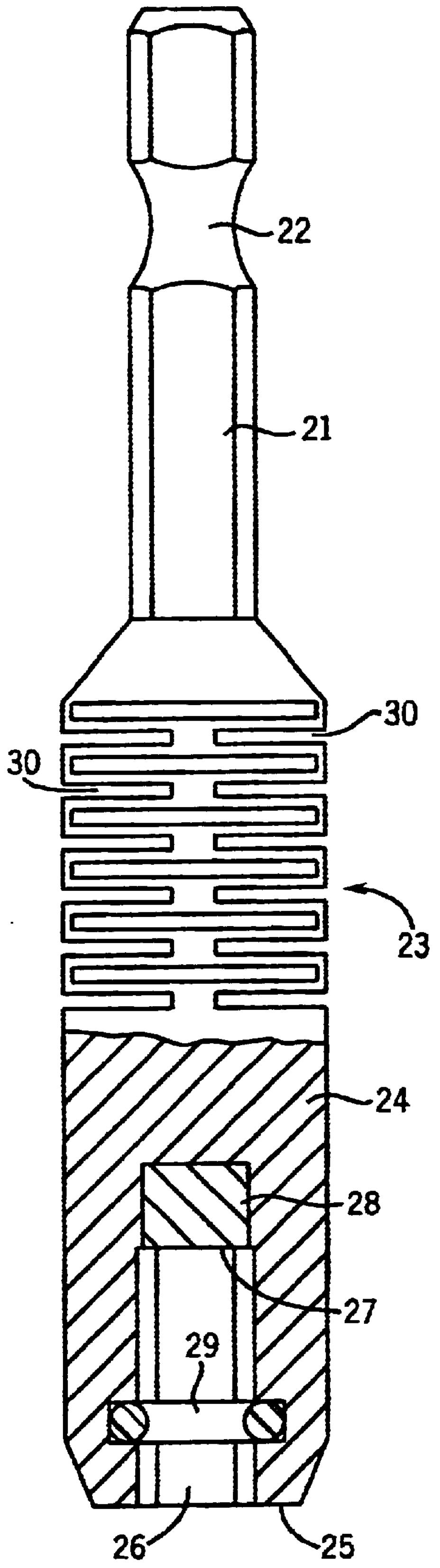
FIG. 3 A part axial sectional view of another embodiment.

FIG. 3 shows an embodiment of a connecting element in which the drive part, driven part and coupling element are constructed in one piece. The drive part 21 is constructed as a hexagonal shank, which is inserted in a corresponding receptacle of a tool and can be locked there by a clamping element, which engages in a constriction 22 of the shank 21.

To the shank 21 is then connected the coupling element 23 constructed as a spring washer coupling. The construction has already been described in connection with FIG. 1. To the coupling element 23 is connected the driven part 24, which is constructed as a cylindrical body with an axial recess 26 open to the face 25. The recess 26 has a hexagonal cross-section, so that a bit can be inserted in it.

In the bottom 27 of the recess 26 is inserted a magnet 28 serving to magnetize the bit, so that in this way a screw is held on the bit.

For locking the bit the recess 26 can have a circumferential groove in which is inserted an O-ring 29. On inserting the bit it is compressed in such a way that it non-positively fixes the bit.

In an embodiment of the connecting element according to the invention the gaps 30 between the individual spring washers can be extruded with a plastics material, e.g. elastomer. As a result no dirt, chips or the like can penetrate the gaps of the spring washer coupling, which might influence the characteristics thereof. For simplification reasons the extrusion with the plastics material is not illustrated. Extrusion can also take place in such a way that the entire outer contour of the coupling element 23 is covered.

Figure 4:
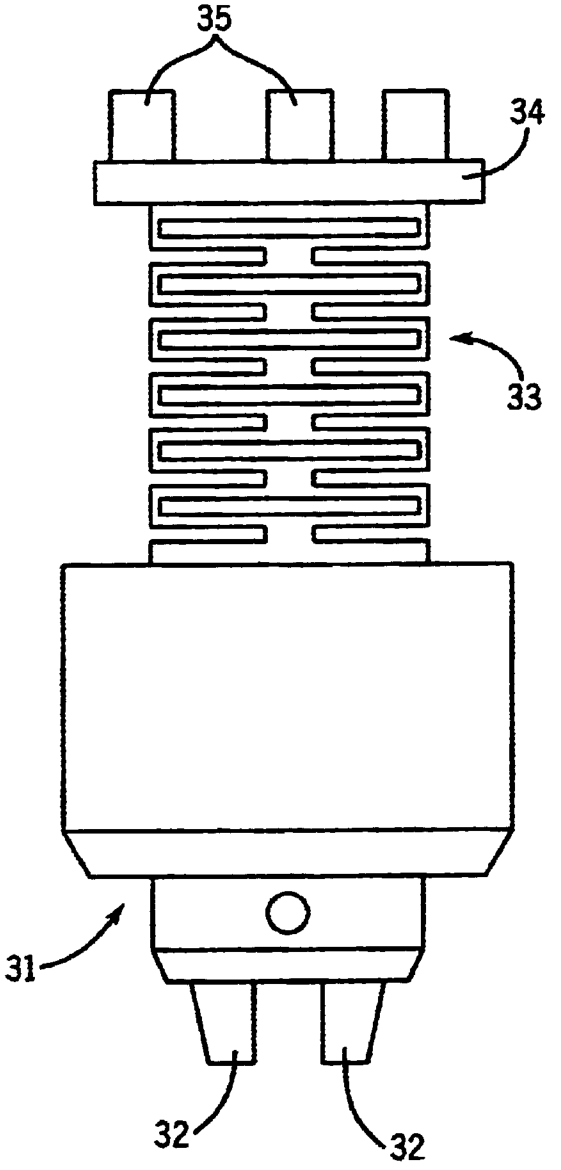
FIG. 4 A representation corresponding to FIG. 3 of an embodiment with a drill chuck.

FIG. 4 shows another embodiment, where it is part of an automatic drill. On the outer end of the connecting element is placed a drill chuck 31 with the aid of which a drill can be clamped between several jaws 32. The drill chuck is connected by means of a coupling element 33, constructed as a spring washer coupling, to a plate 34. On the plate 34 are constructed three journals 35, which can serve to mount gearwheels. These gearwheels form part of a planetary gear with which the drill chuck 31 is driven in rotary manner.

In the case of this connecting element once again between the drive part, in this case the washer 34, the coupling element 33 and part of the drill chuck in which the jaws 32 are mounted a one-piece formation exists.

Whereas in the embodiment according to FIG. 1 the coupling element with the spring washer coupling serves exclusively to flatten torque peaks on reaching an end stop, the spring washer coupling in the embodiments of FIGS. 3 and 4 can also allow an angle compensation and/or an axial displacement.

What is claimed is:

1. A connecting apparatus for connecting a rotary driving apparatus to a tool, the connecting apparatus comprising:

a tool fixture (5) at one end for holding a tool;

a driven element (1) at an opposite end for connection to the rotary driving apparatus, and a jointed cylindrical spring device (11) having a plurality of annular portions (15) connected by resilient web portions (16), said spring device (11) being coupled to, and axially extending beyond, the tool fixture (5) at one end and being coupled to, and axially extending beyond, the driven element (5) at an opposing end, such that the spring device (15) spans a gap (17) between the tool fixture (5) and the driven element (1), said spring device (11) being able to axially constrict in response to torsional force and to then axially extend in response to release of torsional force to reduce transmission of torsional impacts from the tool to the rotary driving apparatus; and wherein the webs (16) are made of an extruded, elastomeric plastic material which seals spaces between the annular members against intrusion of dirt or debris.

2. A connecting apparatus for connecting a rotary driving apparatus to a tool, the connecting apparatus comprising:

a tool fixture (5) at one end for holding a tool;

a driven element (1) at an opposite end for connection to the rotary driving apparatus, and a jointed cylindrical spring device (11) having a plurality of annular portions (15) connected by resilient web portions (16), said spring device (11) being coupled to, and axially extending beyond, the tool fixture (5) at one end and being coupled to, and axially extending beyond, the driven element (5) at an opposing end, such that the spring device (15) spans a gap (17) between the tool fixture (5) and the driven element (1), said spring device (11) being able to axially constrict in response to torsional force and to then axially extend in response to release of torsional force to reduce transmission of torsional impacts from the tool to the rotary driving apparatus; and wherein said spring device is coupled to the driven element (1) through an axially slideable, but non-rotational, element (12), and wherein said spring device (11) is also coupled to the tool fixture (5) through an axially slideable, but non-rotational, element (13) to allow axial travel of the driven element (1) and the tool fixture (5) relative to said spring device.

3. The connecting apparatus of claim 1, further comprising a outer sleeve (10) extending around said gap (17) and enclosing said gap (17) between an end of the driven element and an opposing end of the tool fixture.

4. The connecting apparatus of claim 1, wherein the driven element is a tool shank and wherein the tool fixture is a socket having an O-ring situated inside for retaining a tool inserted into the socket.

5. The connecting apparatus of claim 1, wherein the driven element includes a set of three journals for coupling to the rotary driving apparatus and wherein the tool fixture is a chuck that can be opened and closed on a tool.

6. The connecting apparatus of claim 1, wherein the driven element and the tool fixture are always retained in axially aligned relationship relative to an axis of rotation for the driven element.

* * * * *